(12) United States Patent
Li

(10) Patent No.: US 12,179,524 B2
(45) Date of Patent: Dec. 31, 2024

(54) DISCONNECTED INNER TUBE AND TIRE

(71) Applicant: Xiamen Chengshin Enterprise Co., Ltd., Fujian (CN)

(72) Inventor: Ruihua Li, Fujian (CN)

(73) Assignee: Xiamen Chengshin Enterprise Co., Ltd., Fujian (CN)

( * ) Notice: Subject to any disclaimer, the term of this patent is extended or adjusted under 35 U.S.C. 154(b) by 202 days.

(21) Appl. No.: 17/344,279

(22) Filed: Jun. 10, 2021

(65) Prior Publication Data
US 2021/0300119 A1    Sep. 30, 2021

Related U.S. Application Data

(63) Continuation of application No. PCT/CN2019/092176, filed on Jun. 21, 2019.

(30) Foreign Application Priority Data

| Jan. 31, 2019 | (CN) | 201910098974.0 |
| Jan. 31, 2019 | (CN) | 201910099812.9 |
| Jan. 31, 2019 | (CN) | 201920177074.0 |
| Jan. 31, 2019 | (CN) | 201920177242.6 |

(51) Int. Cl.
*B60C 5/00* (2006.01)
*B60C 5/10* (2006.01)

(52) U.S. Cl.
CPC ..................... *B60C 5/10* (2013.01)

(58) Field of Classification Search
CPC .... B60C 5/00; B60C 5/04; B60C 5/02; B60C 5/10
See application file for complete search history.

(56) References Cited

U.S. PATENT DOCUMENTS 716,693 A * 12/1902 Esse ........................... B60C 5/04
885,796 A *  4/1908 Shearman ................. B60C 5/04
152/391

(Continued)

FOREIGN PATENT DOCUMENTS

| CH | 198594 A | 6/1938 |
| CN | 200960834 Y | 10/2007 |

(Continued)

OTHER PUBLICATIONS

International Search Report and English Translation cited in PCT/CN2019/092176 mailed Oct. 28, 2019, 7 pages.

(Continued)

*Primary Examiner* — Cedrick S Williams
(74) *Attorney, Agent, or Firm* — Cooper Legal Group, LLC

(57) ABSTRACT

An inner tube having a disconnected pattern, two ends of the inner tube having the disconnected pattern is respectively disposed with a first joint and a second joint. Free ends of the first joint and the second joint are respectively disposed with a first closed surface and a second closed surface; a sleeve further extends from a free end of the first joint or the second joint in a length direction of an inner tube body; the first joint and the second joint are connected face-to-face by the sleeve to enable the inner tube body having an elongated shape to be spliced to define an inner tube linked end-to-end. A tire, which uses the inner tube having the disconnected pattern.

23 Claims, 13 Drawing Sheets

(56) References Cited

U.S. PATENT DOCUMENTS

| | | | |
|---|---|---|---|
| 913,850 A * | 2/1909 | Rees | B60C 5/04 152/511 |
| 1,317,976 A * | 10/1919 | Hower | B60C 5/04 152/511 |
| 1,486,055 A | 3/1924 | Stranahan et al. | |
| 3,225,143 A | 12/1965 | Parker | |
| 2015/0367683 A1 * | 12/2015 | Zhao | B23P 6/00 29/402.09 |
| 2016/0193875 A1 | 7/2016 | Lu | |

FOREIGN PATENT DOCUMENTS

| | | |
|---|---|---|
| CN | 201042910 Y * | 4/2008 |
| CN | 201419613 Y | 3/2010 |
| CN | 204820965 U | 12/2015 |
| CN | 205706005 U | 11/2016 |
| CN | 107627637 A | 1/2018 |
| CN | 109895559 A | 6/2019 |
| CN | 109910505 A | 6/2019 |
| CN | 210101202 U | 2/2020 |
| DE | 737816 C | 7/1943 |
| DE | 2832546 A1 | 2/1980 |
| DE | 10032300 C | 1/2002 |
| GB | 26049 A | 4/1912 |
| GB | 718634 A | 11/1954 |
| JP | S59206205 A | 11/1984 |
| JP | 2008044444 A | 2/2008 |
| JP | 2010100270 A | 5/2010 |
| JP | 2016016719 A | 2/2016 |
| JP | 3225143 U | 2/2020 |

OTHER PUBLICATIONS

Written Opinion cited in PCT/CN2019/092176 mailed Oct. 28, 2019, 5 pages.
Corresponding European Patent Application No. EP19914082.3, Search Report dated Sep. 27, 2022.
Corresponding European Patent Application No. EP19914082.3, Search Opinion dated Oct. 7, 2022.
Corresponding Korean Patent Application No. KR 10-2021-7004540, Opinion dated Jul. 17, 2022.
Corresponding Korean Patent Application No. KR 10-2021-7004540, Decision on Registration dated Sep. 29, 2022.
Corresponding Japanese Patent Application No. 2019-218383, Notice of Reasons for Refusal dated Jan. 19, 2021.
Corresponding Japanese Patent Application No. 2019-218383, Decision to Grant dated Jul. 13, 2021.
Corresponding Japanese Patent Application No. 2019-218383, Search Report dated Nov. 16, 2020.

* cited by examiner

DISCONNECTED INNER TUBE AND TIRE

RELATED APPLICATIONS

This application a continuation application of International Patent Application PCT/CN2019/092176, filed on Jun. 21, 2019, which claims priority to Chinese patent application number 201910099812.9, filed Jan. 31, 2019, Chinese patent application number 201920177242.6, filed Jan. 31, 2019, Chinese patent application number 201910098974.0, filed Jan. 31, 2019, and Chinese patent application number 201920177074.0, filed Jan. 31, 2019. International Patent Application PCT/CN2019/092176 and Chinese patent applications 201910099812.9, 201920177242.6, 201910098974.0, and 201920177074.0 are incorporated herein by reference.

FIELD OF THE DISCLOSURE

The present disclosure relates to tires, and in particular relates to inner tubes.

BACKGROUND OF THE DISCLOSURE

Vehicle tires commonly comprises inner tubes and outer tires. Traditional inner tubes are continuous circles. When the vehicle tires are damaged, the inner tubes need to be replaced or repaired, the inner tubes need to be completely removed from the outer tires and then repaired, or new inner tubes are inserted into the outer tires. In this process, it takes a long time to remove the inner tubes or to replace the inner tubes, and efficiency for replacing the inner tubes is very low.

In order to overcome this problem, there is an inner tube with a disconnected pattern on the market. The inner tube with the disconnected pattern relies on two joints connected face-to-face to form a closed loop. The connected face-to-face relationship between the two joints can be easily released when the inner tube is in a deflated state, so that the inner tube becomes a long strip and can be extracted from the outer tire, which can greatly simplify the time required to replace the inner tube. But despite the obvious advantages of the inner tube with the disconnected pattern, there is still no stable market share on the market for this type of inner tube. This type of inner tube also has several disadvantages.

1. One of the traditional inner tubes with the disconnected pattern comprises snap-fit rubber pieces at ends of the two joints, and the snap-fit rubber pieces themselves are not inflated. The ability of the snap-fit rubber pieces to snap-fit is completely dependent on the shape of the snap-fit rubber pieces themselves. The connection strength of this structure is very limited, and the inner tube easily detaches during driving. Moreover, it is easy to form a clearance where two snap-fit rubber piece snap together, and the air pressure in the clearance is significantly lower than the air pressure inside the inner tube. During driving, when this snap-fit rubber pieces touches the ground, the deformation of the inner tube will increase, making the whole driving process feel bumpy feeling.

2. It is difficult to keep the inner tube, which depends on the connection relationship of the snap-fit rubber piece, in a locked state when the inner tube is not inflated, so it is difficult to ensure the continuity of the inner tube when the inner tube is inserted into the outer tire.

BRIEF SUMMARY OF THE DISCLOSURE

A main technical problem of the present disclosure is to provide an inner tube having a disconnected pattern and an outer tire, and a time for replacing the inner tube can be greatly shortened.

In order to solve the technical problem, the present disclosure provide an inner tube having a disconnected pattern, which comprises an inner tube body having an elongated shape. Two ends of the inner tube body having the elongated shape respectively comprise a first closed surface and a second closed surface, one end of the two ends extends to define a sleeve along a length direction of the inner tube body having the elongated shape, the first closed surface and the second closed surface are connected face-to-face by the sleeve to enable the inner tube body having the elongated shape to be spliced to define the inner tube linked end-to-end, and after the inner tube body having the elongated shape is inflated, the first closed surface and the second closed surface are radially expanded and are encompassed and positioned by the sleeve.

In a preferred embodiment, the first closed surface and the second closed surface are in a plug-in connection or a face-to-face abutting connection when in uninflated states.

In a preferred embodiment, the two ends of the inner tube body having the elongated shape are respectively disposed with a first joint and a second joint, and free ends of the first joint and the second joint respectively comprise the first closed surface and the second closed surface.

In a preferred embodiment, when the inner tube body having the elongated shape is in an uninflated state, the first closed surface, the second closed surface, and an inner wall of the sleeve define a matching cooperation or a non-matching cooperation, and when the inner tube body having the elongated shape is in an inflated state, the first closed surface, the second closed surface, and the inner wall of the sleeve define the matching cooperation.

In a preferred embodiment, the second closed surface is a groove, the free end of the second joint extends to define the sleeve along the length direction of the inner tube body having the elongated shape, the first closed surface is a step plug comprising a first hollow plug and a second plug connected along the length direction of the inner tube body having the elongated shape, and when the first hollow plug is inserted into the groove, the second plug is disposed in the sleeve to enable the inner tube body having the elongated shape to be spliced to define the inner tube linked end-to-end.

In a preferred embodiment, the step plug comprises a first air cavity and a second air cavity in communication with each other, a third air cavity is radially disposed between a groove wall of the groove and an inner wall of the second joint, and the first air cavity, the second air cavity, and the third air cavity are respectively in communication with an inflation cavity of the inner tube body having the elongated shape.

In a preferred embodiment, a groove wall of the groove and a sleeve wall of the sleeve are connected by a limiting surface, the first hollow plug and the second plug of the step plug are connected by a first limiting matching surface, the second plug and a side wall of the first joint are connected by a second limiting matching surface, and when the first hollow plug and the groove define a plug-in relationship: the limiting surface abuts the first limiting matching surface to be positioned along a plug-in direction, and the second limiting matching surface abuts an end surface of the sleeve wall of the sleeve to be positioned along the plug-in direction.

In a preferred embodiment, the groove is an arc-shaped groove, the groove, the limiting surface, and the sleeve wall of the sleeve are connected by circular arc-shaped corners, the first hollow plug is correspondingly an arc-shaped plug, and the first hollow plug, the first limiting matching surface, the second plug, the second limiting matching surface, and the side wall of the first joint are connected by circular arc-shaped corners.

In a preferred embodiment, the first closed surface is a first hollow plug, the free end of the first joint extends to define the sleeve along the length direction of the inner tube body having the elongated shape, the first hollow plug is disposed in the sleeve, the second closed surface comprises a groove and a second plug, an end of the second plug is concave to define the groove, and when the first hollow plug is inserted into the groove, the second plug is disposed in the sleeve to enable the inner tube body having the elongated shape to be spliced to define the inner tube linked end-to-end.

In a preferred embodiment, the first hollow plug comprises a first air cavity, a second air cavity is radially disposed between a groove wall of the groove and an inner wall of the second plug, and the first air cavity and the second air cavity are respectively in communication with an inflation cavity of the inner tube body having the elongated shape.

In a preferred embodiment, the first hollow plug and a sleeve wall of the sleeve are connected by a limiting surface.

In a preferred embodiment, the groove and the second plug are connected by a first limiting matching surface, the second plug and a side wall of the second joint are connected by a second limiting matching surface, and when the first hollow plug and the groove define a plug-in relationship: the limiting surface abuts the first limiting matching surface to be positioned along a plug-in direction, and the second limiting matching surface abuts an end surface of the sleeve wall of the sleeve to be positioned along the plug-in direction.

In a preferred embodiment, the groove is an arc-shaped groove, the groove, the first limiting matching surface, the second plug, the second limiting matching surface, and a side wall of the first joint are connected by circular arc-shaped corners, the first hollow plug is correspondingly an arc-shaped plug, and the first hollow plug, the limiting surface, and the sleeve wall of the sleeve are connected by circular arc-shaped corners.

In a preferred embodiment, a thickness of a side wall of the sleeve is 50%-70% of a thickness of a side wall of the inner tube body having the elongated shape.

In a preferred embodiment, a length of the sleeve is 5-10 mm greater than a width of a cross-section of the inner tube body having the elongated shape.

In a preferred embodiment, an axial cross section of the groove is an arc-shaped surface, and a ratio of an arc length of the groove and a perimeter of a cross-section of the inner tube body having the elongated shape is greater than an expansion ratio of the inner tube body having the elongated shape after inflation.

In a preferred embodiment, the arc length of the groove is 120% more than the perimeter of the cross-section of the inner tube body having the elongated shape.

In a preferred embodiment, the axial cross section of the groove is one or a combination of a circular arc-shaped surface, a tapered arc-shaped surface, or an elongated arc-shaped surface.

A vehicle tire comprises the inner tube having the disconnected pattern according to claim 1, an outer tire, and a rim.

Another technical solution of the present disclosure is as follows. An inner tube having a disconnected pattern comprises an inner tube body having an elongated shape. Two ends of the inner tube body having the elongated shape are respectively disposed with a first joint and a second joint, free ends of the first joint and the second joint respectively comprise a first closed surface and a second closed surface configured to be plugged with each other, one end of the two ends extends to define a sleeve along a length direction of the inner tube body having the elongated shape, and the first closed surface and the second closed surface are plugged by the sleeve to enable the inner tube body having the elongated shape to be spliced to define the inner tube linked end-to-end, and after the inner tube body having the elongated shape is inflated, the first closed surface and the second closed surface are radially expanded and are encompassed and positioned by the sleeve.

In a preferred embodiment, the second closed surface is a concave groove comprising a limiting surface and a groove, the free end of the second joint extends to define the sleeve along the length direction of the inner tube body having the elongated shape, the first closed surface is a step plug comprising a first hollow plug and a second plug connected along the length direction of the inner tube body having the elongated shape, an outer wall of the first hollow plug is coupled with an inner wall of the groove, the second plug is coupled with the sleeve, and a first limiting matching surface disposed between the first hollow plug and the second plug is corresponding coupled with the limiting surface of the concave groove.

In a preferred embodiment, an inner side of the step plug comprises a first air cavity and a second air cavity in communication with each other, the limiting surface and the groove of the concave groove and an inner wall of the second joint define an annular third air cavity, the first air cavity, the second air cavity, and the annular third air cavity are respectively in communication with an inflating cavity of the inner tube body having the elongated shape, and when the inner tube having the disconnected pattern is inflated: the step plug and the concave groove are radially expanded under air pressure of the first air cavity, the second air cavity, and the annular third air cavity, the limiting surface and the groove of the concave groove are stretched to be concave arc-shaped surfaces, the first hollow plug and the first limiting matching surface of the step plug are stretched to be convex arc-shaped surfaces, so that an arc-shaped tight cooperation is defined and are encompassed and positioned by the sleeve. That is, an arc-shaped cooperation between the concave arc-shaped surfaces and the convex arc-shaped surfaces is encompassed by the sleeve.

Compared with the existing techniques, the technical solution has the following advantages.

1. The present disclosure provides an inner tube comprising a sleeve, and a joint of the inner tube is encompassed in the sleeve to enable the entire inner tube body to define a closed ring. Assembly and disassembly of two joints have outstanding guiding properties due to a guiding effect of the sleeve, and the assembly and the disassembly are very convenient. Even in an uninflated state, the joint does not easily fall from the sleeve due to a limiting function of the sleeve.

2. The present disclosure provides the inner tube. During an inflation process, the two joints are also inflated to be expanded, while the sleeve itself will not be inflated and will be only unfurled during an expansion of the two joints due to a material of the sleeve. Therefore, a holding force between an inner wall of the sleeve and the two joints becomes greater during progress of the inflation process. Therefore, it is ensured that the two joints do not fall from the sleeve after the inflation.

3. The present disclosure provides the inner tube. The two joints are expanded after the inflation so that closed surfaces of the two joints are tightly matched together after the inflation. There is no clearance between the two joints to effectively avoid bump occurrence (i.e., the occurrence of the bumpy feeling while driving).

4. The present disclosure provides the inner tube, and an annular air cavity is disposed between a groove and an inner wall of a joint. The annular air cavity is expanded to squeeze the groove during the inflation process so that the groove is more tightly clamped to a plug.

5. The present disclosure provides an inner tube. Transition parts adopt circular corner designs to effectively avoid a problem of stress concentration, and the inner tube can be used for a long time without bursting.

DETAILED DESCRIPTION OF THE EMBODIMENTS

The present disclosure will be further described below in combination with the accompanying drawings and embodiments.

The embodiment provides an inner tube having a disconnected pattern that comprises an inner tube body having an elongated shape, and two ends of the inner tube body respectively comprise a first closed surface and a second closed surface, and one end of the two ends extends to define a sleeve in a length direction of the inner tube body, and the first closed surface and the second closed surface are connected face-to-face by the sleeve to enable the inner tube body having the elongated shape to define the inner tube linked end-to-end.

After the inner tube body is inflated, the first closed surface and the second closed surface are radially expanded and are encompassed and positioned by the sleeve.

The inner tube having the disconnected pattern is very simple to assemble. As long as another end of the two ends of the inner tube body that does not define the sleeve is disposed in the sleeve, the inner tube body can be spliced to define a continuous inner tube. When the inner tube body is inflated, the first closed surface and the second closed surface of the two ends of the inner tube body radially expand, and the first closed surface and the second closed surface finally circumferentially abut each other and are radially encompassed and positioned by the sleeve, so that a spliced strength of the inner tube is greatly strengthened and the inner tube is not easily loosened.

The first closed surface and the second closed surface tightly abut each other after being inflated, and there is no clearance in the entire inner tube. Air pressure of each part can be roughly the same, so that there will be no bumpy feeling during a driving process of a vehicle tire.

In order to realize the inner tube having the disconnected pattern in this disclosure, several detailed embodiments are as follows.

Embodiment 1

Figure 1:
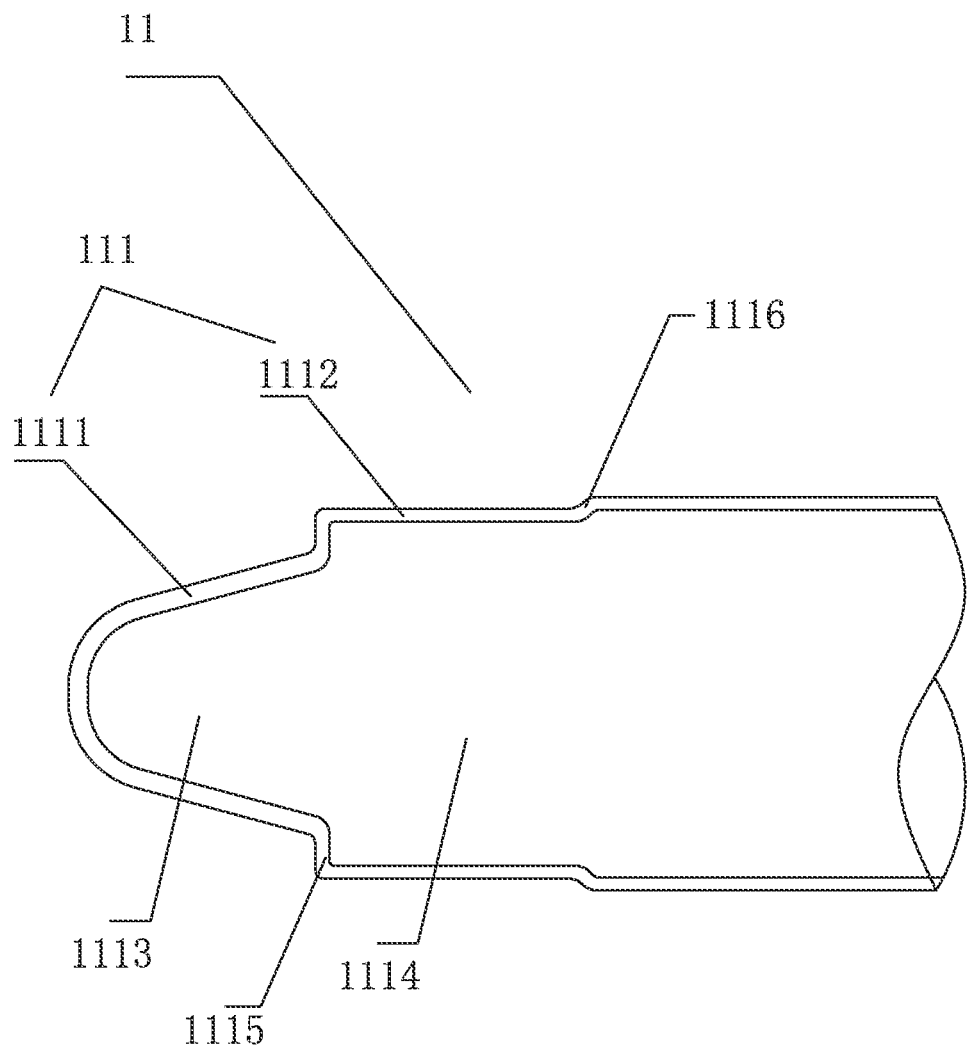
FIG. 1 illustrates a cross-sectional view of a first joint of Embodiment 1 of the present disclosure.
Figure 2:
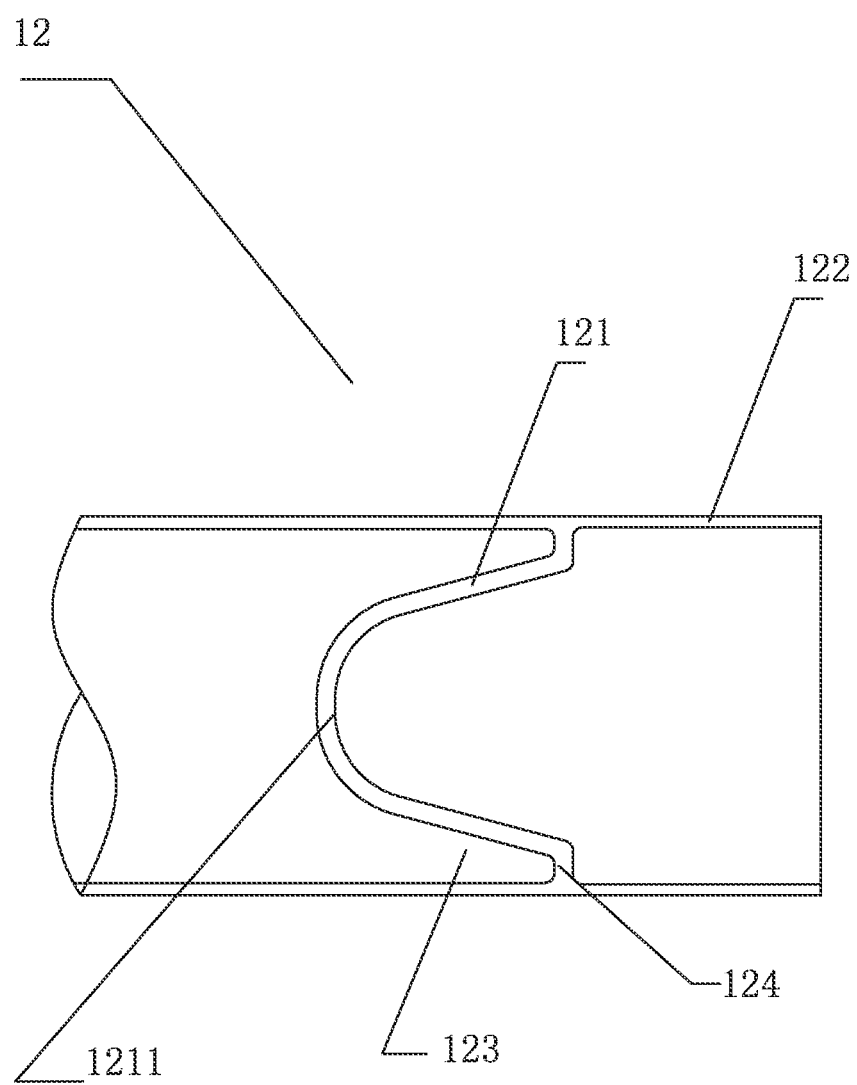
FIG. 2 illustrates a cross-sectional view of a second joint of Embodiment 1 of the present disclosure.
Figure 3:
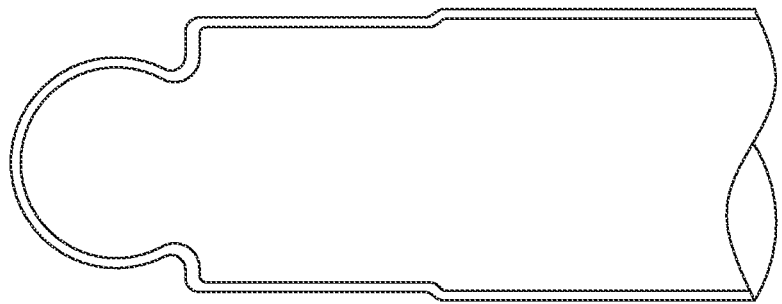
FIGS. 3-8 illustrate views of the first joint and the second joint defining other shapes of Embodiment 1 of the present disclosure.
Figure 4:
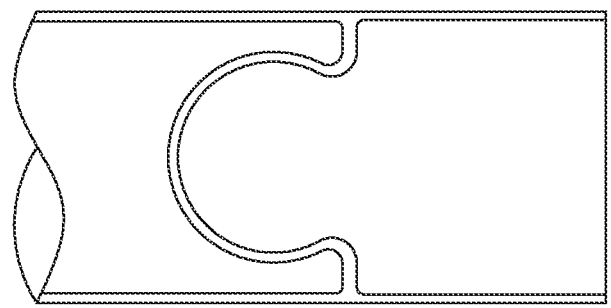
Figure 5:
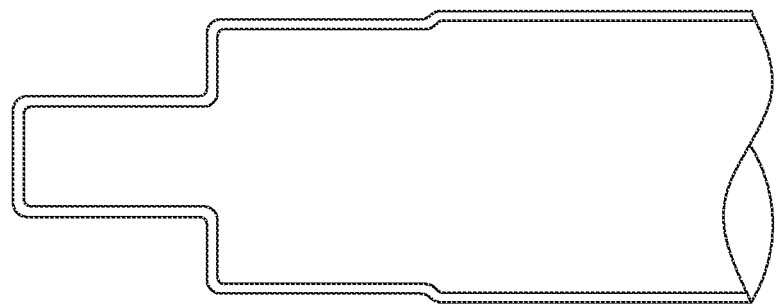
Figure 6:
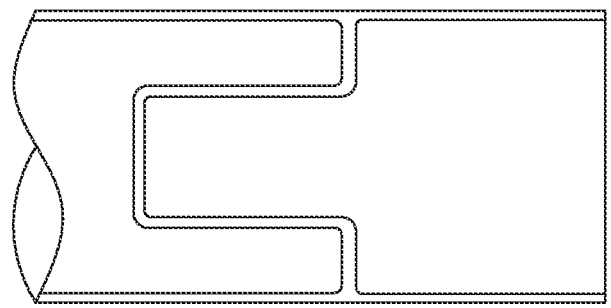
Figure 7:
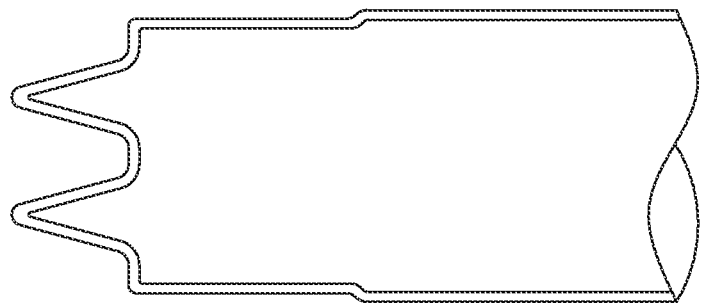
Figure 8:
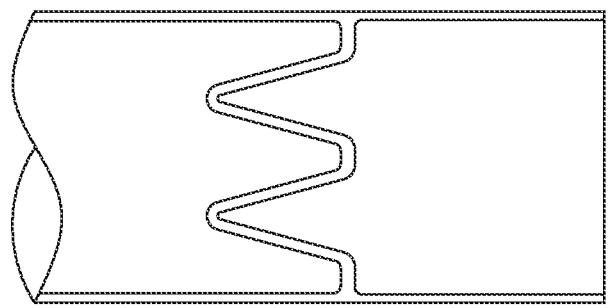

Referring to FIGS. 1 and 2, an inner tube having a disconnected pattern comprises an inner tube body having an elongated shape, and two ends of the inner tube body respectively comprise a first joint 11 and a second joint 12. Free ends of the first joint 11 and the second joint 12 respectively comprise a first closed surface 111 and a second closed surface 121, and a free end of the second joint 12 further extends to define a sleeve 122 in a length direction of the inner tube body.

The first joint 11 and the second joint 12 are connected face-to-face by the sleeve 112 to enable the inner tube body having the elongated shape to define the inner tube linked end-to-end.

In this embodiment, in uninflated states, the first closed surface 111 and the second closed surface 121 define a face-to-face plug-in relationship.

According to a substantive design idea of the present disclosure, the first closed surface 111 can also directly abut the second closed surface 121 without defining a plug-in relationship (i.e., the opposing plug-in relationship).

In this embodiment, in order to achieve the face-to-face plug-in relationship between the first closed surface 111 and the second closed surface 121, the second closed surface 121 is a groove 1211, and the first closed surface 111 is correspondingly a step plug disposed along the length direction of the inner tube body. The step plug comprises a first hollow plug 1111 and a second plug 1112. When the first hollow plug 1111 is inserted into the groove 1211, the second plug 1112 is disposed in the sleeve 122 to enable the inner tube body having the elongated shape to be plugged to define the inner tube linked end-to-end.

Figure 9:
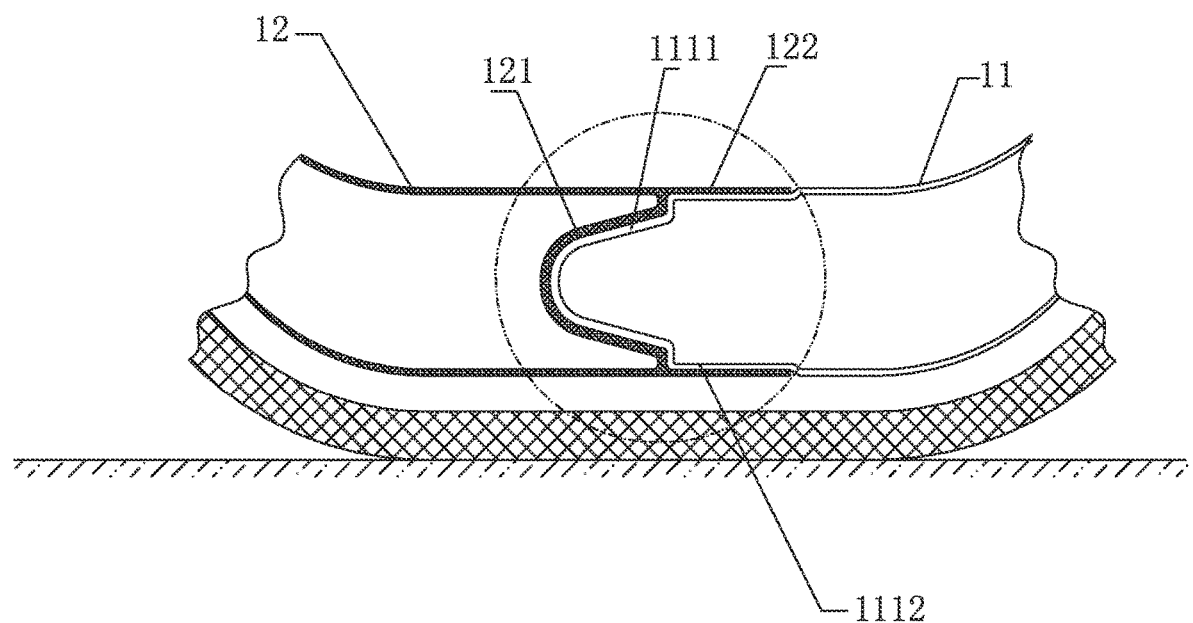
FIG. 9 illustrates a cross-sectional view of an inner tube body in an uninflated state of Embodiment 1 of the present disclosure.
Figure 10:
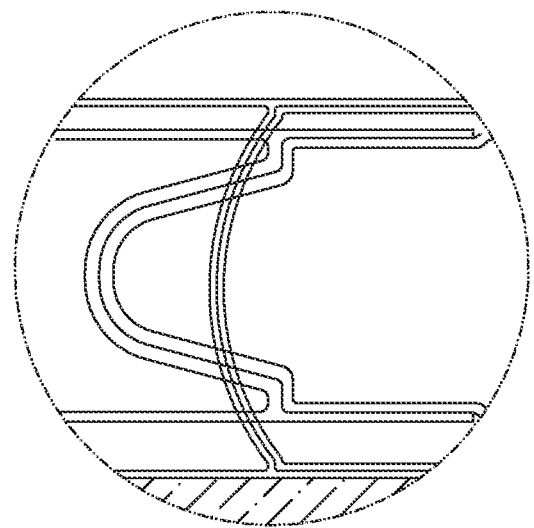
FIG. 10 illustrates a comparison view of a portion of the inner tube body of FIG. 9 in the uninflated state and after inflation, where a dashed line represents the portion of the inner tube body after the inflation.

The two ends of the inner tube body having the elongated shape are single-layer structures defined by an air cavity in the inner tube body having the elongated shape, and the air cavity comprises a first air cavity 1113, a second air cavity 1114, and a third air cavity 123. In detail, the first hollow plug 1111 and the second plug 1112 comprise the first air cavity 1113 and the second air cavity 1114 in communication with each other. The third air cavity 123 is radially disposed between a groove wall of the groove 1211 and an inner wall of the second joint 12 from a top end of the groove wall of the groove 1211 to a bottom end of the groove wall of the groove 1211. The first air cavity 1113, the second air cavity 1114, and the third air cavity 123 are respectively in communication with an inflation cavity of the inner tube body. Therefore, when the inner tube body is inflated, it is ensured that the first hollow plug 1111, the second plug 1112, and the groove 1211 are all configured to be radially expanded. The first hollow plug 1111 and the groove 1211 are expanded to abut and tightly cooperate with each other, and the second plug 1112 is expanded and then tightly cooperates with an inner wall of the sleeve 122. As the sleeve 122 is not spontaneously expanded during the inflating, the sleeve 122 encompasses the second plug 1112 and the first hollow plug 1111 at all times during the expanding of the second plug 1112. The existence of the third air cavity 123 enables the groove 1211 to radially squeeze an upper side and a lower side of the groove 1211 during the expanding, so that the groove 1211 can sufficiently tightly encompass the first hollow plug 1111. Referring to FIGS. 9 and 10, the groove 1211 and the first hollow plug 1111 define a slightly arc-shaped and tight cooperation in the sleeve 122.

In further detail, the groove 1211 is a concave groove, which comprises the groove 1211 and a limiting surface 124. The first hollow plug 1111 is connected to the second plug 1112 by a first limiting matching surface 1115, and the second plug 1112 is connected to a side wall of the first joint 11 by a second limiting matching surface 1116. The first hollow plug 1111, the first limiting matching surface 1115, the second plug 1112, the second limiting matching surface 1116, and a side wall of the inner tube body having the elongated shape cooperate to define a structure with an outer wall narrowing toward a free end of the first hollow plug 1111, and the second limiting matching surface 1116 is an inclined surface narrowing in a direction facing the free end of the first hollow plug 1111.

When the first hollow plug 1111 and the groove 1211 define a plug-in relationship, the limiting surface 124 abuts the first limiting matching surface 1115 to be positioned along a plug-in direction, and the second limiting matching surface 1116 abuts an end surface of a sleeve wall of the sleeve 122 to be positioned along the plug-in direction. These two positioning relationships can provide clear indications for a plug-in process to prevent a user from plugging too shallow or too deep during the plug-in process.

Further, the third air cavity 123 has an annular shape and is defined between the groove 1211, the limiting surface 124, and the inner wall of the second joint 12. When being inflated, the step plug and the concave groove both are radially expanded due to pressures of the first air cavity 1113, the second air cavity 1114, and the third air cavity 123. The limiting surface 124 and the groove 1211 (i.e., the concave groove) are stretched to define slightly concave arc-shaped surfaces, and the first hollow plug 1111 and the first limiting matching surface 1115 of the step plug are stretched to define slightly convex arc-shaped surfaces so that the slightly arc-shaped and tight cooperation is defined (referring to FIG. 10) and is encompassed and positioned by the sleeve 122. That is, an arc-shaped cooperation between the concave arc-shaped surfaces and the convex arc-shaped surfaces is encompassed by the sleeve 122. An inner wall of the groove 1211 and an inner wall of the limiting surface 124 are connected by a first circular arc-shaped corner, and the inner wall of the limiting surface 124 and the side wall of the inner tube body having the elongated shape are connected by a second circular arc-shaped corner.

In this embodiment, in order to reduce a problem of stress concentration, the groove 1211 is an arc-shaped groove, and an outer wall of the groove 1211, an outer wall of the limiting surface 124, and the sleeve wall of the sleeve 122 are connected in sequence by third circular arc-shaped corners. In this embodiment, an axial cross section of the groove 1211 is a tapered arc-shaped surface. As a simple replacement of this embodiment, referring to FIGS. 3-8, the axial cross section of the groove 1211 can also be one of a circular arc-shaped surface, an elongated arc-shaped surface, or a combination of the aforementioned various arc-shaped sections.

The first hollow plug 1111 is correspondingly an arc-shaped plug, and the first hollow plug 1111, the first limiting matching surface 1115, the second plug 1112, the second limiting matching surface 1116, and the side wall of the first joint 11 are also connected in sequence by fourth circular arc-shaped corners. The first limiting matching surface 1115, the second plug 1112, and the side wall of the inner tube body having the elongated shape cooperate to define a structure with an outer wall narrowing toward a free end of the second plug 1112.

This embodiment further comprises the following preferred features: a thickness of the side wall of the sleeve 122 is 50%-70% of a thickness of a side wall of the inner tube body, wherein the thickness of the side wall of the sleeve 122 and the thickness of the side wall of the inner tube body are both widths in uninflated states. An object of this arrangement is as follows: a thickness after the second plug 1112 is superimposed on the sleeve 122 can be the same as the thickness of the sidewall of the inner tube body, so that a bumpy feeling during driving caused by an uneven thickness is avoided.

A length of the sleeve 122 is 5-10 mm greater than a width of a cross-section of the inner tube body. Therefore, it is ensured that the sleeve 122 can define a certain depth so that the second plug 1112 is not easily loosened and falls from the sleeve 122.

The axial cross section of the groove 1211 is an arc-shaped surface, and a ratio of an arc length of the groove 1211 and a perimeter of the cross-section of the inner tube body is greater than an expansion ratio of the inner tube body after inflation and the inner tube body before inflation.

In detail, the axial cross section of the groove 1211 is the arc-shaped surface, and the arc length of the groove 1211 is 120% more than the perimeter of the cross-section of the inner tube body. This arrangement enables the groove 1211 to have a certain length so that the inner tube body does not easily break after expansion and stretching.

In this embodiment, outer walls of the first hollow plug 1111 and the second plug 1112 and an inner wall of the sleeve 122 are respectively frosted surfaces to increase a frictional force of plug-in parts. At the same time, an outer wall of the inner tube comprises convex points or patterns that increase frictional force, and when the user plugs the inner tube, positions of the convex points and the patterns correspond to a holding position.

This embodiment further provides a vehicle tire, which comprises an inner tube, an outer tire, and a rim. The inner tube is the inner tube having the disconnected pattern. After the inner tube is used, the time needed to replace the inner tube can be shortened from a traditional half an hour to five minutes. An efficiency for replacing the inner tube is greatly improved, the vehicle tire using the inner tube does not cause the bumpy feeling during the driving, and comfort is very high. As the inner tube overcomes the problem of the stress concentration, the inner tube does not easily bulge and burst after a long time of driving.

Embodiment 2

Figure 11:
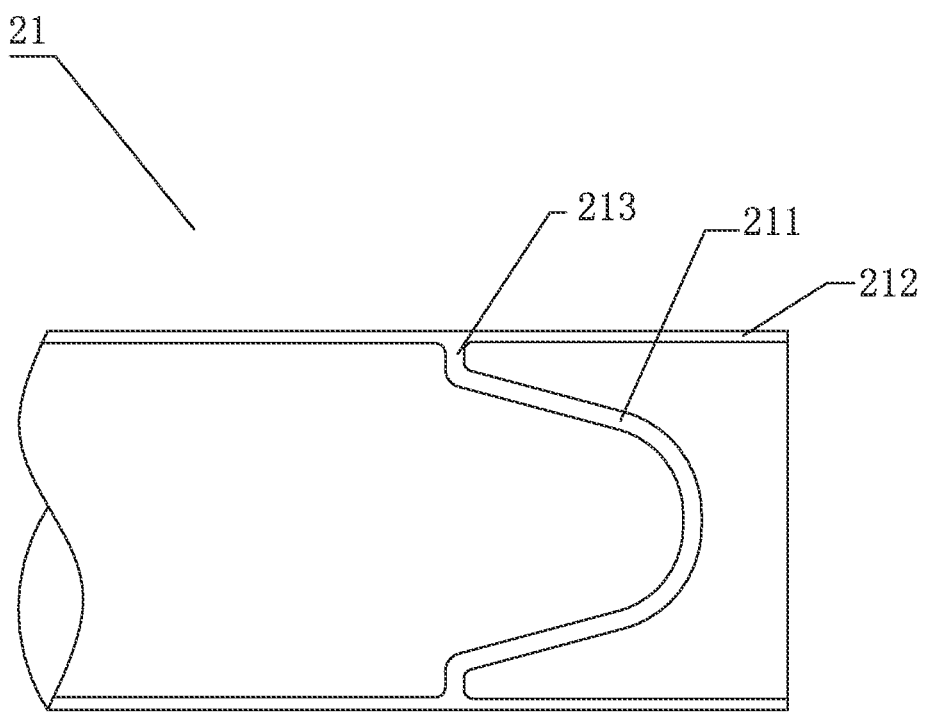
FIG. 11 illustrates a cross-sectional view of a first joint of Embodiment 2 of the present disclosure.
Figure 12:
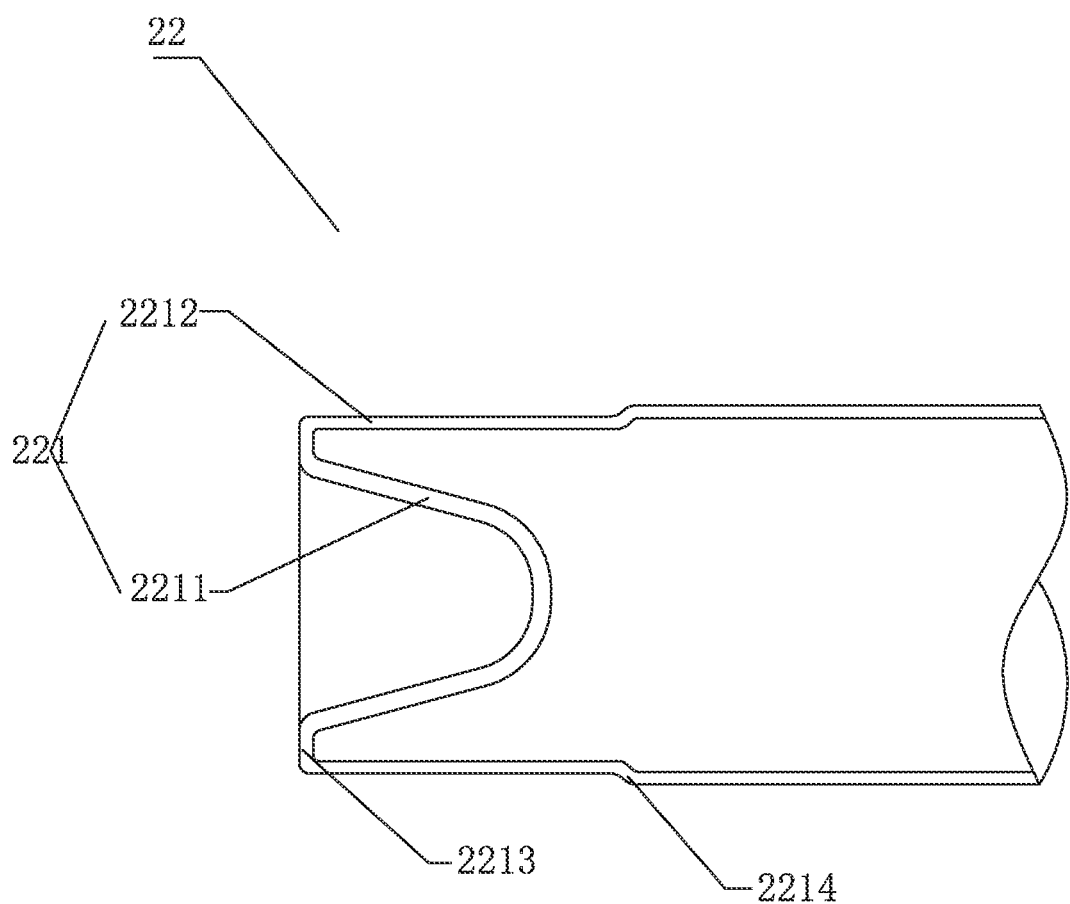
FIG. 12 illustrates a cross-sectional view of a second joint of Embodiment 2 of the present disclosure.
Figure 13:
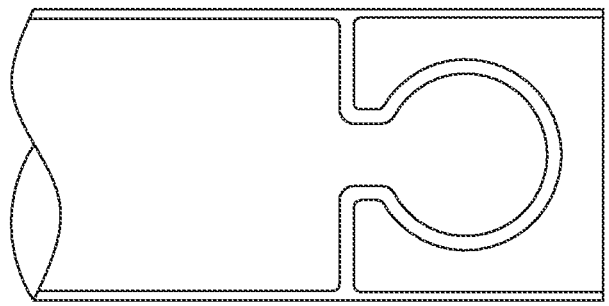
FIGS. 13-18 illustrate views of the first joint and the second joint defining other shapes of Embodiment 2 of the present disclosure.
Figure 14:
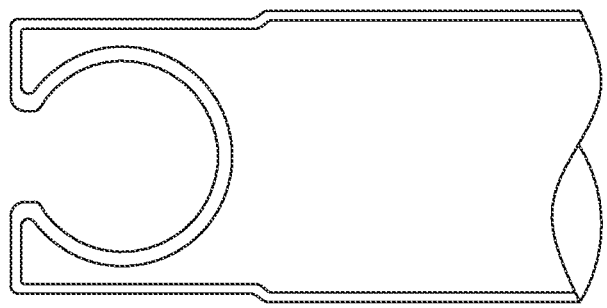
Figure 15:
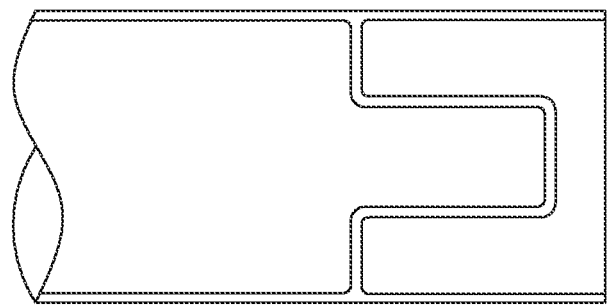
Figure 16:
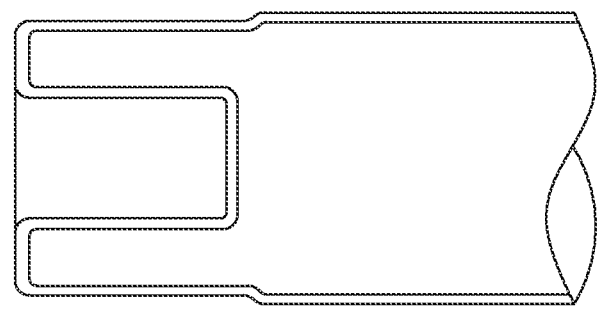
Figure 17:
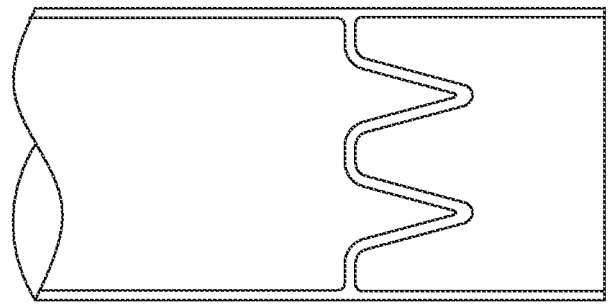
Figure 18:
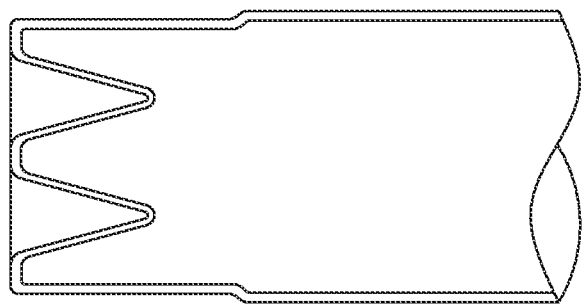

Referring to FIGS. 11 and 12, this embodiment differs from Embodiment 1 in that the sleeve 212 is disposed on a side of a first hollow plug. In more detail, a first closed surface 211 defines the first hollow plug, a free end of the first joint 21 extends to define the sleeve 212 along the length direction of the inner tube body, and the first hollow plug is disposed in the sleeve 212.

A second closed surface 221 comprises a groove 2211 and the second plug 2212, and an end of the second plug 2212 is concave to define the groove 2211. When the first hollow plug is inserted into the groove 2211, the second plug 2212 is disposed in the sleeve 212 to enable the inner tube body having the elongated shape to be plugged to define the inner tube linked end-to-end.

The two ends of the inner tube body having the elongated shape are single-layer structures defined by an air cavity in the inner tube body having the elongated shape, and the air cavity comprises a first air cavity and a second air cavity. Similarly, the first hollow plug comprises the first air cavity, and the second air cavity is radially disposed between a groove wall of the groove 2211 and an inner wall of the second plug 2212. The first air cavity and the second air cavity are respectively in communication with the inflation cavity of the inner tube body.

The first hollow plug is connected to a sleeve wall of the sleeve 212 by a first limiting matching surface 213. The groove 2211 is connected to the second plug 2212 by a limiting surface 2213, and the second plug 2212 and a side wall of the second joint 22 are connected by a second limiting matching surface 2214. The limiting surface 2213, the second plug 2212, and the side wall of the inner tube body having the elongated shape cooperate to define a structure with an outer wall narrowing toward a free end of the second plug 2212. The second limiting matching surface 2214 is an inclined surface narrowing in a direction facing the free end of the second plug 2212.

When the first hollow plug and the groove 1211 define a plug-in relationship, the first limiting matching surface 213 abuts the limiting surface 2213 to be positioned along the plug-in direction, and the second limiting matching surface 2214 abuts an end surface of the sleeve wall of the sleeve 212 to be positioned along the plug-in direction.

The groove 2211 is an arc-shaped groove. As a simple replacement of this embodiment, referring to FIGS. 13-18, an axial cross-section of the groove 2211 can also be one of a circular arc-shaped surface, an elongated arc-shaped surface, or a combination of the aforementioned various arc-shaped cross-sections.

Side walls of the groove 2211, the limiting surface 2213, the second plug 2212, the second limiting matching surface 2214, and the second joint 22 are connected in sequence by third circular arc-shaped corners.

The first hollow plug is correspondingly an arc-shaped plug, and the first hollow plug, the first limiting matching surface 213, and the side wall of the sleeve 212 are connected in sequence by circular arc-shaped corners.

The rest of the structure of Embodiment 2 is the same as Embodiment 1 and will not be further described.

Embodiment 3

Figure 19:
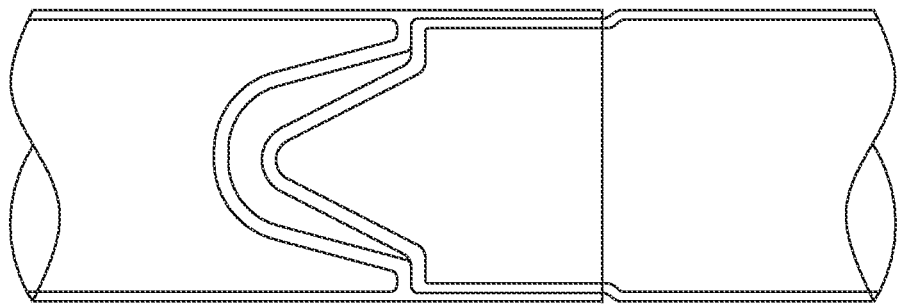
FIGS. 19-21 illustrate connection views of a first joint and a second joint in uninflated states of Embodiment 3 of the present disclosure.
Figure 20:
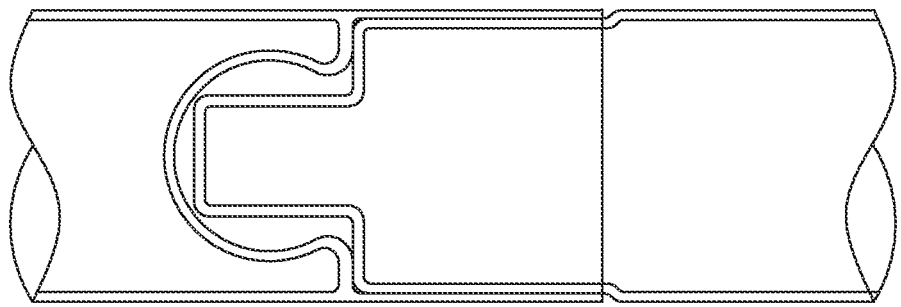
Figure 21:
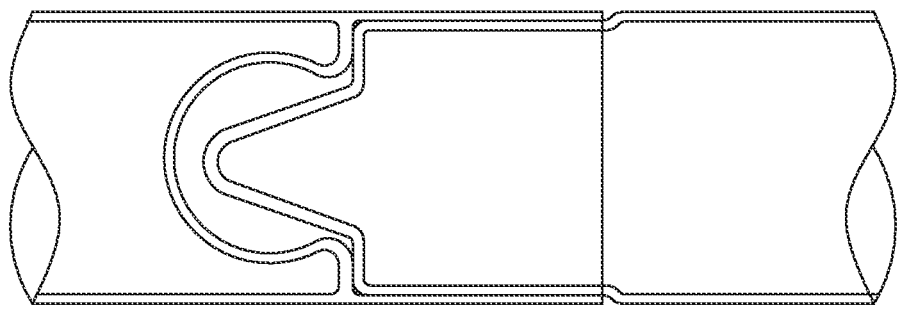

Referring to FIGS. 19-21, in Embodiments 1 and 2, in uninflated states, the first hollow plug and the groove and the second plug and the inner wall of the sleeve are in completely matching cooperation. In fact, in the uninflated states, the first closed surface, the second closed surface, and the inner wall of the sleeve can also be non-matching cooperation as long as the first closed surface, the second closed surface, and the inner wall of the sleeve are ensured to be in matching cooperation when the inner tube body is in the inflated state.

The non-matching cooperation means that the first closed surface, the second closed surface, and the inner wall of the sleeve are completely separated or define a partial matching cooperation. That is, referring to FIGS. 19, 20, and 21, shapes of the groove and the plug that are plugged with each other are not exactly the same.

Embodiment 4

In the aforementioned embodiments, in the uninflated state, the first joint and the second joint define a plug-in state that the groove and the joint are plugged with each other face-to-face. In fact, the first joint and the second joint can also be replaced by two joints that abut each other face-to-face, as long as one joint can be plugged into the sleeve of the other joint.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure. Therefore, the scope of the disclosure is defined by the scope of the claims.

What is claimed is:
1. An inner tube having a disconnected pattern, comprising:
   an inner tube body having an elongated shape, wherein:
      two ends of the inner tube body having the elongated shape are respectively disposed with a first joint and a second joint,
      the two ends of the inner tube body having the elongated shape are single-layer structures defined by an air cavity in the inner tube body having the elongated shape,
      free ends of the first joint and the second joint respectively comprise a first closed surface and a second closed surface configured to be plugged with each other,
      one end of the two ends extends to define a sleeve along a length direction of the inner tube body having the elongated shape,
      the first closed surface and the second closed surface are plugged by the sleeve to enable the inner tube body having the elongated shape to be spliced to define the inner tube linked end-to-end,
      the second closed surface comprises a groove,
      the groove and the inner tube body having the elongated shape are connected by a limiting surface,
      an inner wall of the groove and an inner wall of the limiting surface are connected by a first circular arc-shaped corner,
      the inner wall of the limiting surface and a side wall of the inner tube body having the elongated shape are connected by a second circular arc-shaped corner,
      the first closed surface comprises a first hollow plug,
      the first hollow plug corresponds the groove, the first hollow plug and the side wall of the inner tube body having the elongated shape are connected by a first limiting matching surface, the limiting surface defines a first planar annular ring, the first limiting matching surface defines a second planar annular ring, when the first hollow plug and the groove are connected by inserting the first hollow plug into the groove to define a plug-in relationship, the first limiting matching surface abuts the limiting surface to be positioned along a plug-in direction, and after the inner tube body having the elongated shape is inflated, the first hollow plug, and the groove are radially expanded, the first closed surface and the second closed surface circumferentially abut each other and are encompassed and positioned by the sleeve, the limiting surface and the groove are stretched to be concave arc-shaped surfaces, the first hollow plug and the first limiting matching surface are stretched to be convex arc-shaped surfaces, and an arc-shaped cooperation between the concave arc-shaped surfaces and the convex arc-shaped surfaces is encompassed by the sleeve.

2. The inner tube having the disconnected pattern according to claim 1, wherein:

the second closed surface is a concave groove comprising the limiting surface and the groove, the free end of the second joint extends to define the sleeve along the length direction of the inner tube body having the elongated shape, the first closed surface is a step plug comprising the first hollow plug and a second plug connected along the length direction of the inner tube body having the elongated shape, an outer wall of the first hollow plug is coupled with the inner wall of the groove, the second plug is coupled with the sleeve, and the first limiting matching surface is disposed between the first hollow plug and the second plug and is corresponding coupled with the limiting surface of the concave groove.

3. The inner tube having the disconnected pattern according to claim 2, wherein:

the air cavity comprises a first air cavity, a second air cavity, and an annular third air cavity, an inner side of the step plug comprises the first air cavity and the second air cavity in communication with each other, the limiting surface and the groove of the concave groove and an inner wall of the second joint define the annular third air cavity, the first air cavity, the second air cavity, and the annular third air cavity are respectively in communication with an inflating cavity of the inner tube body having the elongated shape, and when the inner tube having the disconnected pattern is inflated:

the step plug and the concave groove are radially expanded under air pressure of the first air cavity, the second air cavity, and the annular third air cavity, the limiting surface and the groove of the concave groove are stretched to be the concave arc-shaped surfaces, and the first hollow plug and the first limiting matching surface of the step plug are stretched to be the convex arc-shaped surfaces so that the arc-shaped cooperation is defined by the limiting surface, the groove, the first hollow plug, and the first limiting matching surface, and the limiting surface, the groove, the first hollow plug, and the first limiting matching surface are encompassed and positioned by the sleeve.

4. An inner tube having a disconnected pattern, comprising:

an inner tube body having an elongated shape, wherein:

two ends of the inner tube body having the elongated shape respectively comprise a first closed surface and a second closed surface, the two ends of the inner tube body having the elongated shape are single-layer structures defined by an air cavity in the inner tube body having the elongated shape, one end of the two ends extends to define a sleeve along a length direction of the inner tube body having the elongated shape, the first closed surface and the second closed surface are connected face-to-face by the sleeve to enable the inner tube body having the elongated shape to be spliced to define the inner tube linked end-to-end, the second closed surface comprises a groove, the groove and the inner tube body having the elongated shape are connected by a limiting surface, an inner wall of the groove and an inner wall of the limiting surface are connected by a first circular arc-shaped corner, the inner wall of the limiting surface and a side wall of the inner tube body having the elongated shape are connected by a second first circular arc-shaped corner, the first closed surface comprises a first hollow plug, the first hollow plug corresponds to the groove, the first hollow plug and the side wall of the inner tube body having the elongated shape are connected by a first limiting matching surface, the limiting surface defines a first planar annular ring, the first limiting matching surface defines a second planar annular ring, when the first hollow plug and the groove are connected by inserting the first hollow plug into the groove to define a plug-in relationship, the first limiting matching surface abuts the limiting surface to be positioned along a plug-in direction, and after the inner tube body having the elongated shape is inflated, the first hollow plug, and the groove are radially expanded, the first closed surface and the second closed surface circumferentially abut each other and are encompassed and positioned by the sleeve, the limiting surface and the groove are stretched to be concave arc-shaped surfaces, the first hollow plug and the first limiting matching surface are stretched to be convex arc-shaped surfaces, and an arc-shaped cooperation between the concave arc-shaped surfaces and the convex arc-shaped surfaces is encompassed by the sleeve.

5. The inner tube having the disconnected pattern according to claim 4, wherein the first closed surface and the second closed surface are in a plug-in connection or a face-to-face abutting connection when in uninflated states.

6. The inner tube having the disconnected pattern according to claim 4, wherein a thickness of a side wall of the sleeve is 50%-70% of a thickness of the side wall of the inner tube body having the elongated shape.

7. The inner tube having the disconnected pattern according to claim 4, wherein a length of the sleeve is 5-10 mm greater than a width of a cross-section of the inner tube body having the elongated shape.

8. A vehicle tire, comprising:
the inner tube having the disconnected pattern according to claim 4,
an outer tire, and
a rim.

9. The inner tube having the disconnected pattern according to claim 4, wherein:
the two ends of the inner tube body having the elongated shape are respectively disposed with a first joint and a second joint, and
free ends of the first joint and the second joint respectively comprise the first closed surface and the second closed surface.

10. The inner tube having the disconnected pattern according to claim 3, wherein:
when the inner tube body having the elongated shape is in an uninflated state, the first closed surface, the second closed surface, and an inner wall of the sleeve define a matching cooperation or a non-matching cooperation, and
when the inner tube body having the elongated shape is in an inflated state, the first closed surface, the second closed surface, and the inner wall of the sleeve define the matching cooperation.

11. The inner tube having the disconnected pattern according to claim 9, wherein:
the free end of the second joint extends to define the sleeve along the length direction of the inner tube body having the elongated shape,
the first closed surface is a step plug comprising the first hollow plug and a second plug connected along the length direction of the inner tube body having the elongated shape,
a diameter of the second plug is larger than a maximum diameter of the first hollow plug, and
when the first hollow plug is inserted into the groove, the second plug is disposed in the sleeve to enable the inner tube body having the elongated shape to be spliced to define the inner tube linked end-to-end.

12. The inner tube having the disconnected pattern according to claim 9, wherein:
the free end of the first joint extends to define the sleeve along the length direction of the inner tube body having the elongated shape,
the first hollow plug is disposed in the sleeve,
the second closed surface comprises the groove and a second plug,
an end of the second plug is concave to define the groove,
the limiting surface, the second plug, and the side wall of the inner tube body having the elongated shape cooperate to define a structure with an outer wall narrowing toward a free end of the second plug, and
when the first hollow plug is inserted into the groove to define the plug-in relationship, the second plug is disposed in the sleeve to enable the inner tube body having the elongated shape to be spliced to define the inner tube linked end-to-end.

13. The inner tube having the disconnected pattern according to claim 12, wherein:
the air cavity comprises a first air cavity and a second air cavity,
the first hollow plug comprises the first air cavity,
the second air cavity is radially disposed between a groove wall of the groove and an inner wall of the second plug, and
the first air cavity and the second air cavity are respectively in communication with an inflation cavity of the inner tube body having the elongated shape.

14. The inner tube having the disconnected pattern according to claim 13, wherein the first hollow plug and a sleeve wall of the sleeve are connected by the first limiting matching surface.

15. The inner tube having the disconnected pattern according to claim 14, wherein:
the inner wall of the groove and the inner wall of the second plug are connected by the first limiting surface,
the second plug and a side wall of the second joint are connected by a second limiting matching surface,
the second limiting matching surface is an inclined surface narrowing in a direction facing the free end of the second plug, and
when the first hollow plug and the groove define the plug-in relationship:
the second limiting matching surface abuts an end surface of the sleeve wall of the sleeve to be positioned along the plug-in direction.

16. The inner tube having the disconnected pattern according to claim 15, wherein:
the groove, the limiting surface, the second plug, the second limiting matching surface, and a side wall of the first joint are connected in sequence by third circular arc-shaped corners, and
the first hollow plug, the first limiting matching surface, and the sleeve wall of the sleeve are connected in sequence by fourth third circular arc-shaped corners.

17. The inner tube having the disconnected pattern according to claim 3, wherein:
the free end of the second joint extends to define the sleeve along the length direction of the inner tube body having the elongated shape,
the first closed surface is a step plug comprising the first hollow plug and a second plug connected along the length direction of the inner tube body having the elongated shape, and
when the first hollow plug is inserted into the groove, the second plug is disposed in the sleeve to enable the inner tube body having the elongated shape to be spliced to define the inner tube linked end-to-end.

18. The inner tube having the disconnected pattern according to claim 17, wherein:
the air cavity comprises a first air cavity, a second air cavity, and a third air cavity,
the step plug comprises the first air cavity and the second air cavity in communication with each other,
the third air cavity is radially disposed between a groove wall of the groove and an inner wall of the second joint from a top end of the groove wall of the groove to a bottom end of the groove wall of the groove, and
the first air cavity, the second air cavity, and the third air cavity are respectively in communication with an inflation cavity of the inner tube body having the elongated shape.

19. The inner tube having the disconnected pattern according to claim 17, wherein:
a groove wall of the groove and a sleeve wall of the sleeve are connected by the limiting surface,
the first hollow plug and the second plug of the step plug are connected by the first limiting matching surface, the second plug and a side wall of the first joint are connected by a second limiting matching surface, the first hollow plug, the first limiting matching surface, the second plug, the second limiting matching surface, and the side wall of the inner tube body having the elongated shape cooperate to define a structure with an outer wall narrowing toward a free end of the first hollow plug, the second limiting matching surface is an inclined surface narrowing in a direction facing the free end of the first hollow plug, and when the first hollow plug and the groove define the plug-in relationship:
the second limiting matching surface abuts an end surface of the sleeve wall of the sleeve to be positioned along the plug-in direction.

20. The inner tube having the disconnected pattern according to claim 19, wherein:

an outer wall of the groove, an outer wall of the limiting surface, and the sleeve wall of the sleeve are connected in sequence by third circular arc-shaped corners, and the first hollow plug, the first limiting matching surface, the second plug, the second limiting matching surface, and the side wall of the first joint are connected in sequence by fourth circular arc-shaped corners.

21. The inner tube having the disconnected pattern according to claim 17, wherein:

an axial cross section of the groove is an arc-shaped surface, and a ratio of an arc length of the groove and a perimeter of a cross-section of the inner tube body having the elongated shape is greater than an expansion ratio of the inner tube body having the elongated shape after inflation.

22. The inner tube having the disconnected pattern according to claim 21, wherein:

the arc length of the groove is 120% more than the perimeter of the cross-section of the inner tube body having the elongated shape.

23. The inner tube having the disconnected pattern according to claim 22, wherein the axial cross section of the groove is one or a combination of a circular arc-shaped surface, a tapered arc-shaped surface, or an elongated arc-shaped surface.

* * * * *